United States Patent [19]
Friedow et al.

[11] Patent Number: 5,788,344
[45] Date of Patent: Aug. 4, 1998

[54] HYDRAULIC UNIT FOR AN ANTI-LOCK BRAKE SYSTEM

[75] Inventors: Michael Friedow, Tamm; Juergen Lander, Stuttgart; Heidi Kroebel, Heilbronn, all of Germany

[73] Assignee: Robert Bosch GmbH, Stuttgart, Germany

[21] Appl. No.: 699,872

[22] Filed: Aug. 20, 1996

[30] Foreign Application Priority Data

Aug. 26, 1995 [DE] Germany ............... 195 31 468.9

[51] Int. Cl.$^6$ ........................................ B60T 8/36
[52] U.S. Cl. .................... 303/119.2; 188/352; 303/900; 303/901
[58] Field of Search ............... 303/119.2, 119.1, 303/113.1, 900, 901, 113.2, 68, 69, 116.1, 116.2; 188/352; 137/599, 533.13; 251/267, 129.01, 117

[56] References Cited

U.S. PATENT DOCUMENTS

| | | | |
|---|---|---|---|
| 4,568,131 | 2/1986 | Blomberg et al. | 303/119.1 |
| 4,702,532 | 10/1987 | Anderson | 188/352 |
| 4,821,770 | 4/1989 | Parrott et al. | 188/352 |
| 4,902,077 | 2/1990 | Belart et al. | 188/352 |
| 5,203,617 | 4/1993 | Wilde | 303/113.2 |
| 5,324,101 | 6/1994 | Kehl et al. | 188/352 |
| 5,403,078 | 4/1995 | Farr | 188/352 |
| 5,425,575 | 6/1995 | Schmidt et al. | |
| 5,443,309 | 8/1995 | Beck | 303/119.2 |
| 5,445,448 | 8/1995 | Wolff et al. | 303/900 |
| 5,505,529 | 4/1996 | Siegel | |
| 5,522,426 | 6/1996 | Zutt et al. | 137/533.13 |
| 5,538,335 | 7/1996 | Saito et al. | 188/352 |

FOREIGN PATENT DOCUMENTS

| | | |
|---|---|---|
| 9407067 | 3/1994 | WIPO . |
| 9513945 | 5/1995 | WIPO . |

*Primary Examiner*—Douglas C. Butler
*Attorney, Agent, or Firm*—Edwin E. Greigg; Ronald E. Greigg

[57] ABSTRACT

The invention relates to a hydraulic unit for a vehicle brake system with ABS. Before being filled with brake fluid, the brake system must be evacuated in order to achieve complete bleeding. In order to evacuate a return line, which is separated from a brake line by pressure reduction magnet valves that are closed in their position of repose, it is known to provide a connecting line with a check valve between the brake line and the return line. The hydraulic unit connects the check valves in parallel to the magnet valves and integrates the check valves with the magnet valves. This simplifies assembly. Since no additional holes and conduits in the hydraulic unit are necessary, existing hydraulic units can be used.

8 Claims, 4 Drawing Sheets

5,788,344

1

HYDRAULIC UNIT FOR AN ANTI-LOCK BRAKE SYSTEM

BACKGROUND OF THE INVENTION

The invention is based on a hydraulic unit for an anti-lock motor vehicle brake system.

One such brake system is known from German Patent Disclosure DE 43 37 133 A1, U.S. Pat. No. 5,505,529. Such brake systems must be bled before or during filling with brake fluid in order to assure their full efficiency. Air bubbles remaining in the brake system would cause compressibility of the brake fluid, with the consequence that an adequate brake fluid pressure could not be built up. It is therefore indispensible to bleed the brake system fully.

Bleeding of brake systems equipped with anti-lock arrangements (ABS) and/or traction control (ASR) is difficult, because of the built-in magnet valves, return pumps and similar hydraulic components, since these components furnish the brake fluid with small, hidden spaces in which air bubbles can stick, bubbles are not displaced by the brake fluid when the brake system is filled. The course of the brake liner in the hydraulic unit of such brake systems is also full of ramifications and sharp angles and consequently presents obstacles to complete bleeding.

The known brake systems are therefore evacuated before being filled with brake fluid. The problem then arises that magnet valves that are closed in the state of repose and return pump valves can trap air in the brake line system that remains there when the brake system is evacuated and is only incompletely removed in the ensuing filling of brake fluid.

It has therefore been proposed that the magnet valves that are closed in the state of repose be electrically triggered and thus opened upon evacuation before the filling of the brake system. Supplying current to these magnet valves requires special plug connectors and electrical triggering, which are expensive to manufacture and difficult to use.

For this reason, the aforementioned DE 43 37 133 A1 proposes the use of check valves in the hydraulic unit of the brake system that open as a result of the evacuation of the brake system and that in this way connect those parts of the brake system that are separated from the remaining brake system by the closed magnet valves and the return pumps to the remainder of the brake system. As a result, evacuation of the entire brake system is accomplished, and full bleeding of the brake system on filling is assured.

OBJECT AND SUMMARY OF THE INVENTION

The hydraulic unit according to the invention has the advantage that no additional holes and conduits for mounting the check valves and their hydraulic interconnection are needed. Existing hydraulic units can be used without modification. Another advantage is economy in terms of assembly costs because the check valves integrated into the magnet valves need not be built in separately.

Not every magnet valve that is closed in the position of repose needs to have a check valve. It suffices to provide check valves such that all the parts of the brake system are evacuated in common, thus including those parts of the brake system that are separated from the remaining brake system by magnet valves that are closed in repose and by valves of the return pumps. It is thus usually sufficient to equip only a single pressure reduction magnet valve in each brake circuit of the brake system with a check valve. For an X-type brake circuit layout (the left front wheel and right

2 rear wheel belong to one brake circuit, and the right front wheel and left rear wheel belong to a second brake circuit), the pressure reduction magnet valves of one axle preferably have the check valve.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
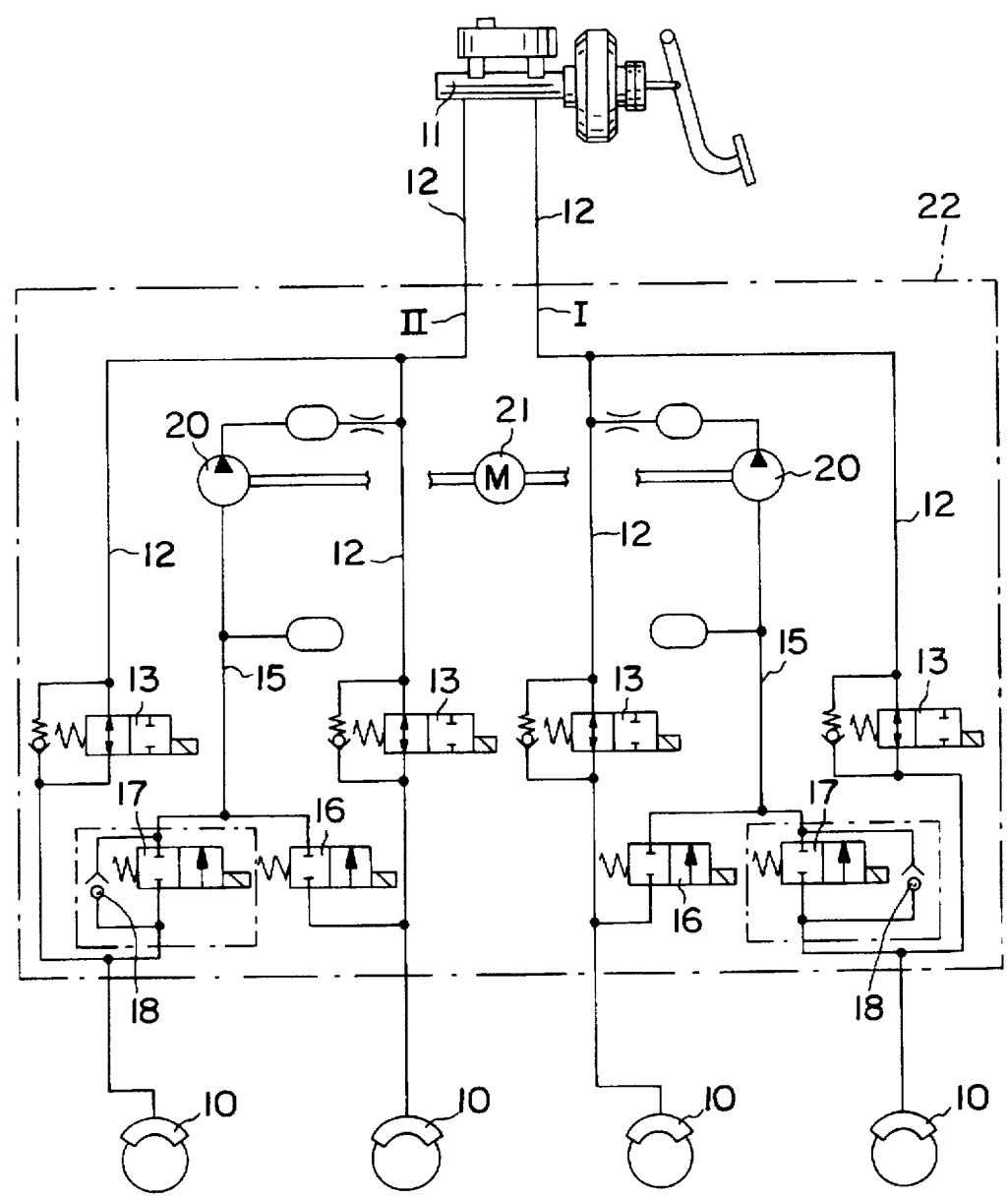
FIG. 1 shows the hydraulic circuit diagram of a brake system with ABS and with a hydraulic unit of the invention.

The brake system shown in FIG. 1 has two identically embodied, independent brake circuits I, II, to each of which two wheel brake cylinders 10 are connected. The brake system is actuated by means of a master cylinder 11. In each brake circuit, one brake line 12 which branches a single time leads from the master cylinder 11 to the wheel cylinders 10. Pressure buildup magnet valves 13 which are open in their position of repose are disposed in the brake lines 12, preceding the wheel cylinders 10.

From the wheel cylinders 10 of each brake circuit I, II, a return line 15 leads back to the master cylinder 11. Pressure reduction magnet valves 16, 17 that are closed in their position of repose are incorporated into the return line 15 for each wheel cylinder 10. One springless check valve 18, which opens in the direction of the wheel cylinder 10, is connected parallel to one of each of the two pressure reduction magnet valves 17 of each brake circuit I, II. The check valve 18 is integrated with the pressure reduction magnet valve 17.

One return pump 20 is also incorporated into which of the two return lines 15, and these return pumps are both driven by a common electric motor 21. The valves 13, 16, 17, 18 and the return pumps 20 are built into a hydraulic unit 22 and are interconnected hydraulically with one another by it. An ABS mode is effected in a manner known per se by brake pressure modulation in the wheel cylinders 10 by means of the pressure buildup magnet valves 13, the pressure reduction magnet valves 16, 17, and the return pumps 20.

For filling, the brake system shown in FIG. 1 is initially evacuated from the master cylinder 11. In the process, the check valves 18 integrated with the pressure reduction magnet valves 17 open, causing the return lines 15 to communicate with the brake line 12, even if the pressure reduction magnet valves 16, 17 are closed and the return pumps 20 block the return lines 15. Next, brake fluid is fed into the evacuated brake system. The check valves 18 that enable evacuation of the entire brake system prevent residual air from remaining in the brake system; they assure complete bleeding of the brake system.

Figure 2:
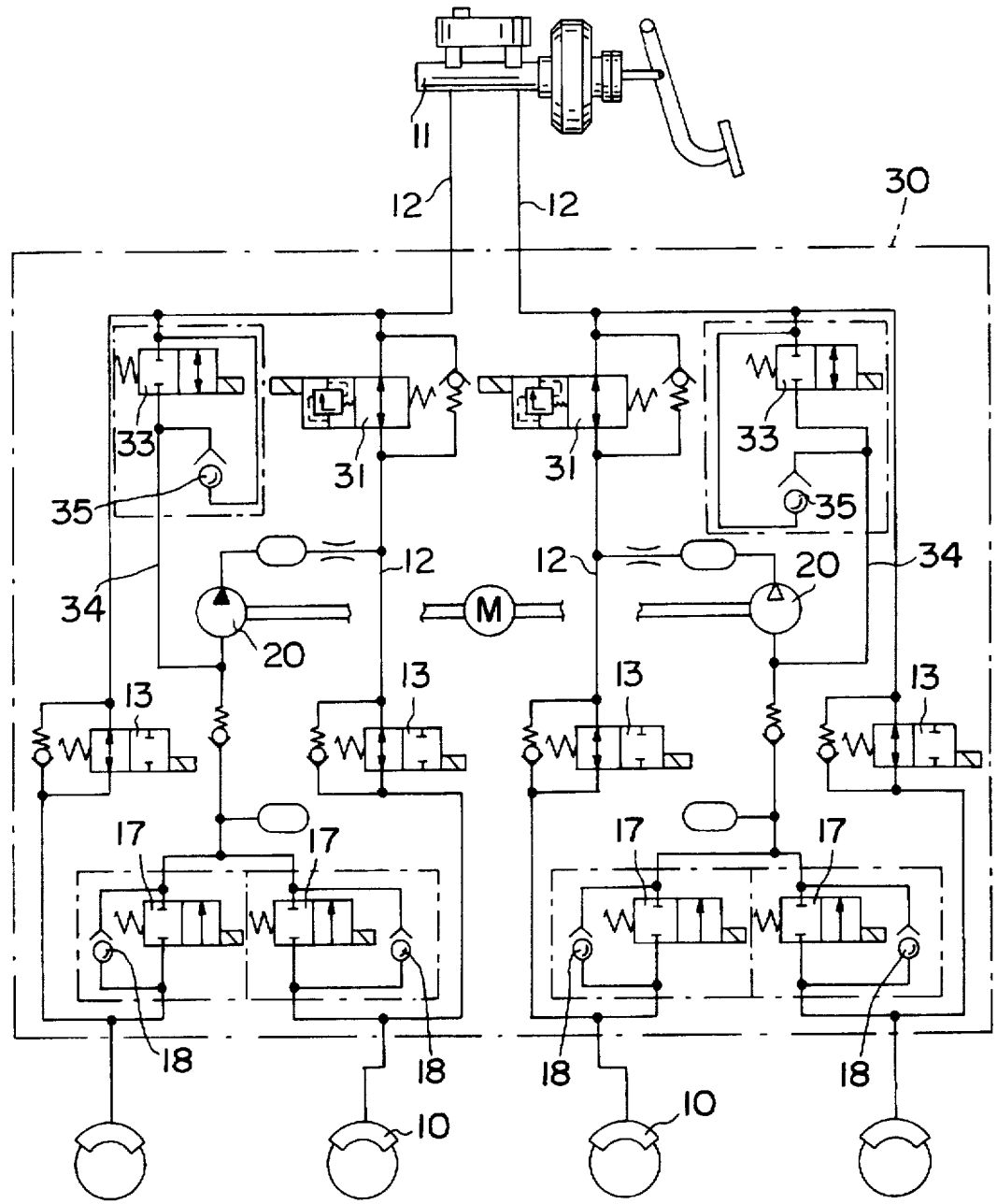
FIG. 2 shows the hydraulic circuit diagram of a brake system with ABS and traction control and with a hydraulic unit according to the invention in accordance with a further embodiment of the invention.

The hydraulic unit 30 of the invention in the brake system shown in FIG. 2 has traction control in addition to the ABS arrangement. Otherwise, this brake system has the same construction as the brake system shown in FIG. 1 and described above. To avoid repetition, only the differences will be described below; for the remainder, reference should be made to the description of FIG. 1. Identical is reference numerals are used for corresponding components.

In the vehicle brake system shown in FIG. 2, springless check valves 18 are integrated with all four pressure reduction magnet valves 17. This has the advantage that only one type of pressure reduction magnet valve 17 is used, which simplifies inventory and in particular prevents the mistaken installation of a pressure reduction magnet valve without a check valve instead of such a valve that has an integrated check valve 18.

For traction control, the hydraulic unit 30 has a switchover magnet valve 31 that is open in its position of repose. The switchover magnet valve 31 is incorporated into the branch of the brake line 12 that leads from the master cylinder 11 to wheel cylinders 10 of driven vehicle wheels. The brake pressure modulation for the purposes of traction control is effected by means of the switchover magnet valves 31, the pressure buildup magnet valves 13, the pressure reduction magnet valves 17, and the return pumps 20 in a manner known per se.

The hydraulic unit 30 also has one aspirating magnet valve 33 in each brake circuit, which valve is closed in its position of repose. This aspirating magnet valve 33 is disposed in an aspiration line 34, which via the brake line 12 is connected directly to the master cylinder 11 and leads to an intake side of the return pumps 20. The aspirating magnet valves 33 serve to improve the aspiration performance of return pumps 20, particularly during traction control.

Connected in parallel to the aspirating magnet valves 33 is a springless check valve 35 that is integrated with the aspirating magnet valves 33. The layout of the aspirating magnet valves 33 with the integrated check valve 35 matches the layout of the pressure reduction magnet valves 17 with the integrated check valve 18, so that identical magnet valves can be used here. The check valves 35 of the aspirating magnet valves 33 assure the complete evacuation of the brake system upon filling.

The check valves 18, 35 integrated with the magnet valves 17, 33 are embodied such that they close upon a minimal pressure buildup in the brake line 12 and disconnect the brake line 12 from the return line 15, so that the brake system functions in the manner known per se.

Figure 3:
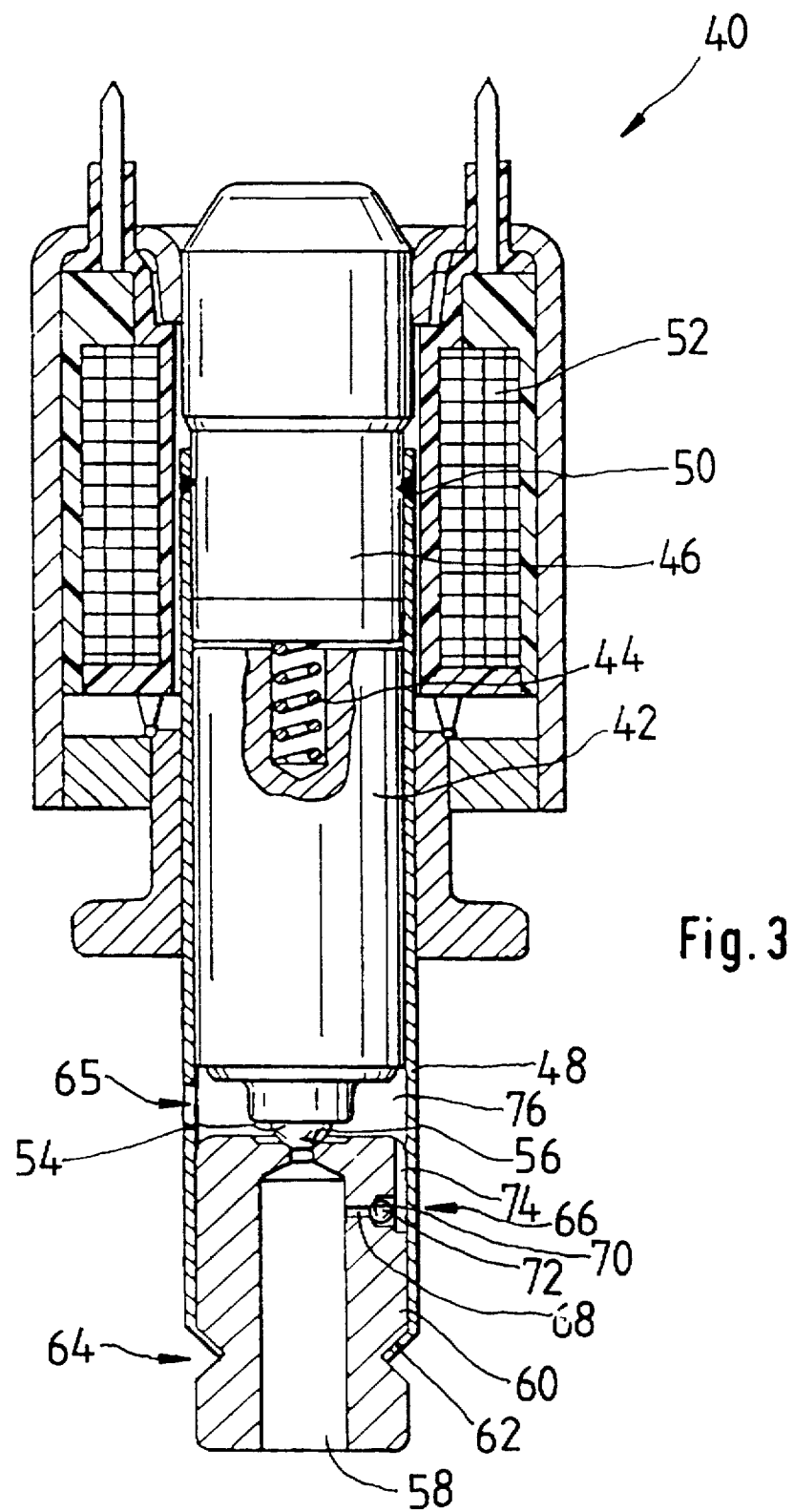
FIG. 3 shows a magnet valve with an integrated check valve according to the invention.

FIG. 3 shows a magnet valve 40 with an integrated check valve that is intended for use in a hydraulic unit according to the invention. The magnet valve 40 has a cylindrical armature 42, which is pressed away from a cylindrical magnet core 46 by a helical compression spring 44 received in a blind bore. The armature 42 is slidingly supported in a hollow-cylindrical sleeve 48 that is slipped over the magnet core 46 and joined to it by an encompassing weld 50. For actuation of the magnet valve 40, an electrical coil 52 surrounds the magnet core 46.

On its face end remote from the magnet core 46, the armature 42 merges integrally with a valve closing body 54 in the form of a spherical layer, which is pressed by the helical compression spring 44 against a conical valve seat face 56. The magnet valve 40 is accordingly closed in its currentless position of repose. The valve seat 56 is formed on a steplike tapered coaxial outlet bore 58, which is mounted in a cylindrical valve seat body 60. The valve seat body is press-fitted into the sleeve 48 and is joined to the sleeve 48 by flanging over of an end edge 62 of the sleeve 48 to form an encompassing V-shaped groove 64 in the valve seat body 60. By the application of current to the coil 52, the armature 42 is attracted to the magnet core 46, and the magnet valve is opened. A bore is provided as an inlet 65 in the tube 48, between the armature 42 and the valve seat body 60.

The check valve 66 is accommodated in the valve seat body 60. It has a radial bore 68 of small diameter, which widens toward the outside with a conical valve seat face 70. Located in the widened portion of the bore 68 is a ball 72 as the valve closing body. The bore 68 leads from the outlet bore 58 to a tangential flattened portion 74 of the valve seat body 60. The flattened portion 74 begins at the check valve 66 and discharges into an intermediate chamber 76 between the armature 42 and the valve seat body 60. Via this intermediate chamber 76, the flattened portion 74 communicates with the inlet 65 of the magnet valve 40. The check valve 66 has no spring or the like.

The stroke of the ball 72 forming the valve closing body is limited by the sleeve 48. The check valve 66 integrated with the magnet valve 40 is connected in parallel to the magnet valve 40; it communicates with its inlet 65 and its outlet bore 58. It opens toward the inlet.

The valve seat body 60 is preferably embodied as fully hardened. However, it may also be embodied as partially hardened or soft in the region of its valve seat faces 56, 70.

Figure 4:
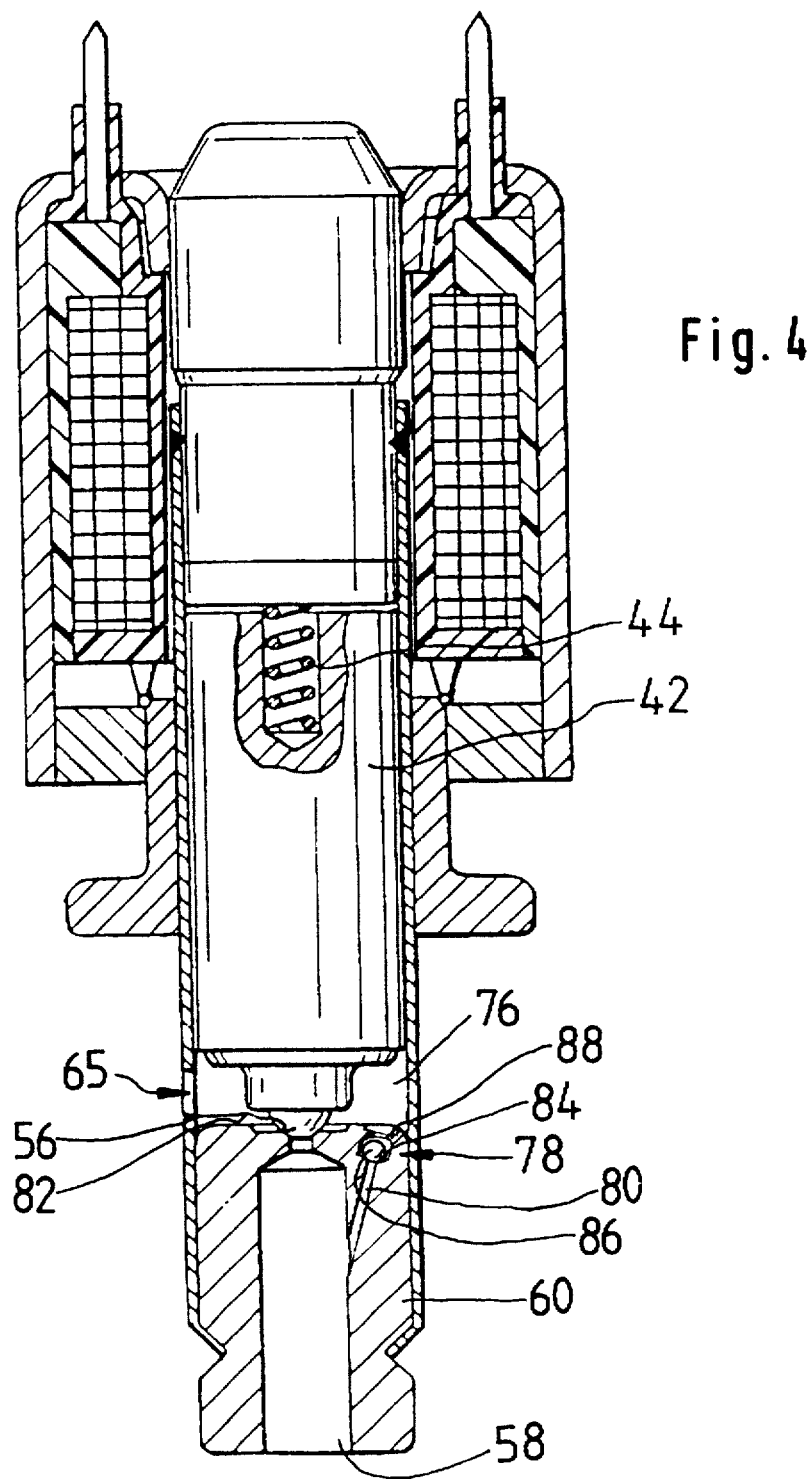
FIG. 4 shows a modified embodiment of the magnet valve of FIG. 3 according to the invention.

FIG. 4 shows a modified embodiment of the magnet valve 40 shown in FIG. 3. Only its check valve 78 is embodied differently. To avoid repetition, only the integrated check valve 78 will be described below; for the remainder, reference is made to the above description of the magnet valve 40 shown in FIG. 3. The same reference numerals are used for corresponding components.

The check valve 78 has a bore 80 of small diameter, which is mounted at an acute angle to the outlet bore 58 in the valve seat body 60. The bore 80 leads from the outlet bore 58 to an end face 82 of the valve seat body 60, which end face is oriented toward the armature 42 and defines the intermediate chamber 76 between the armature 42 and the valve seat body 60. The bore 80 widens with a conical valve seat face 84 in the direction of the intermediate chamber 76. A ball 86 as the valve closing body is located in the widened portion of the bore 80. The stroke of the ball 86 is limited by deformation of two opposed points 88 of the widened portion of the bore 80. The check valve 78 is springless. The integration of the check valve 78 can be accomplished in a simple manner; the conically widening bore 80 need merely be made in the valve seat body 60. A tangential flattening of the valve seat body 60 is unnecessary. Another advantage of the magnet valve shown in FIG. 4 is that with an upright installation, the ball 80 of the integrated check valve 78 is seated by its own weight on the valve seat 85. Accordingly—except when a brake system into which the magnet valve is built is evacuated—the check valve 78 is always closed and the return line is separated from the brake line.

The valve seat body 60 is preferably embodied as soft, but it can also be partially hardened in the region of its valve seat faces 56, 84.

The diameter of the widened portion of the bores 74, 80 of the check valves 66, 78 integrated with the magnet valves of FIGS. 3 and 4 is adapted to the diameter of the balls 72, 86 forming the valve closing body in such a way that a minimal pressure buildup in the intermediate chamber 76, that is, at the inlet 65 of the magnet valve 40, closes the springless check valves 66, 78.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of The United States is:

1. A hydraulic unit for a motor vehicle brake system with ABS, which has at least one magnet valve (40) that includes a hollow cylindrical sleeve (48) and which is closed in a position of repose, said magnet valve including a first valve (65) including a first valve seat (56) formed on a common outlet bore (58), said outlet bore is formed in a cylindrical valve seat body (60) which is press-fitted into one end of said cylindrical sleeve (48), a first valve closing body (54) that opens toward an inlet chamber, a springless check valve (18, 35, 66, 78) which is open upon evacuation of the brake system and is integrated with the at least one magnet valve (17, 33, 40), said check valve including a second valve seat (70, 84) and a second valve closing body, located in a bore (68) in said valve seat body (60) that is approximately at right angles to said outlet bore (58) of the magnet valve (40), said valve closing body (72) is movable between said second valve seat and said cylindrical sleeve (48), a groove (74) in said valve seat body extends from said bore (68) of said valve seat body (60) along an inner surface of said sleeve (48) in a longitudinal direction to an intermediate chamber (76) surrounding said first valve (65), said groove forms a flow conduit inside said sleeve and has a dimension in a radial direction of the valve seat body (60) that is smaller than a diameter of each of said first and second valve closing bodies, and each of said magnet valve and said check valve are disposed upstream of said common outlet bore (58).

2. The hydraulic unit in accordance with claim 1, in which the check valve (18, 35) communicates with an inlet (65) and said common outlet bore (58) of the magnet valve (17, 33, 40).

3. The hydraulic unit in accordance with claim 2, in which the check valve (18, 35, 66, 78) opens in a direction from said common outlet bore (58) to said inlet of the magnet valve (17, 33, 40).

4. The hydraulic unit in accordance with claim 2, in which the check valve (18, 35) is incorporated between a brake line (12) and a return line (15).

5. The hydraulic unit in accordance with claim 1, in which the check valve (18, 35, 66, 78) opens in a direction from said common outlet bore (58) to an inlet of the magnet valve (17, 33, 40).

6. The hydraulic unit in accordance with claim 1, in which the check valve (18, 35) is incorporated between a brake line (12), and a return line (15).

7. The hydraulic unit in accordance with claim 1, in which the magnet valve is a pressure reduction magnet valve (17).

8. The hydraulic unit in accordance with claim 1, in which the magnet valve is an aspirating magnet valve of a brake system equipped with traction control.

* * * * *